United States Patent [19]
McGlothin

[11] Patent Number: 5,462,004
[45] Date of Patent: Oct. 31, 1995

[54] EMERGENCY WARNING FLAG SYSTEMS

[76] Inventor: Clayton E. McGlothin, P.O. Box 71, Mt. Sterling, Ky. 40353

[21] Appl. No.: 164,533

[22] Filed: Dec. 10, 1993

[51] Int. Cl.⁶ .............................. B60Q 7/00; E01F 9/10; A45F 3/44; G09F 15/00
[52] U.S. Cl. ............... 116/63 R; 116/28 R; 116/173; 248/156; 248/545; 40/606; 40/608
[58] Field of Search .................. 116/28 R, 63 R, 116/173, 174, 175, 63 P; 248/156, 160, 530, 545; 404/10, 11; 40/218, 606, 608, 612; 52/155, 156, 157, 158, 165

[56] References Cited

U.S. PATENT DOCUMENTS

| | | | |
|---|---|---|---|
| 1,388,031 | 8/1921 | Dray | 52/157 |
| 1,828,892 | 10/1931 | Felton | 116/173 |
| 4,090,465 | 5/1978 | Bell, Sr. | 40/608 |
| 4,137,662 | 2/1979 | Baumer | 40/608 |
| 4,552,089 | 11/1985 | Mahoney | 116/63 P |
| 4,865,288 | 9/1989 | Dicke et al. | 40/608 |
| 5,090,348 | 2/1992 | Hugron | 40/408 |
| 5,205,236 | 4/1993 | Hughes | 116/63 R |
| 5,224,310 | 7/1993 | Edwards et al. | 52/165 |

*Primary Examiner*—Thomas B. Will
*Assistant Examiner*—Andrew H. Hirshfeld

[57] ABSTRACT

An emergency warning flag system adapted to mark areas for use solely by emergency vehicles including a vertically extending, elongated flag pole having an upper end and a lower end; a flexible flag secured with respect to the upper end of the flag pole; a horizontal aperture extending diametrically through the lower end of the flag pole; a base unit formed generally in the shape of an inverted truncated cone with a vertical slot extending through the upper extent of the cone; attachment means extending downwardly from the base member for securement to the ground; a pin extending horizontally through the hole in the lower end of the flag pole and secured at its ends into the base at a central extent of its vertical slot; and a spring adapted to secure the flag pole in a vertical orientation during normal operation and use of warning motorists not to park thereadjacent, the flag being pivotable about the pin to a generally horizontal orientation when hit by a vehicle moving in contact with the pole.

2 Claims, 4 Drawing Sheets

EMERGENCY WARNING FLAG SYSTEMS

BACKGROUND OF THE INVENTION

1. Field of the Invention

The present invention relates to emergency warning flag systems and more particularly pertains to warning motorists not to park in an emergency zone through a pivotable flag system.

2. Description of the Prior Art

The use of flag systems is known in the prior art. More specifically, flag systems heretofore devised and utilized for the purpose of marking emergency zones are known to consist basically of familiar, expected, and obvious structural configurations, notwithstanding the myriad of designs encompassed by the crowded prior art which has been developed for the fulfillment of countless objectives and requirements.

The prior art discloses a plurality of devices with vertical components pivotable to an essentially horizontal orientation. By way of example are U.S. Pat. No. 5,024,551 to Hinterholzer, U.S. Pat. No. 4,886,232 to Dicke, et al and U.S. Pat. No. 4,822,206 to Roussel, et al.

In this respect, emergency warning flag systems according to the present invention substantially depart from the conventional concepts and designs of the prior art, and in doing so provide an apparatus primarily developed for the purpose of warning motorists not to park in an emergency zone through a pivotable flag system.

Therefore, it can be appreciated that there exists a continuing need for new and improved emergency warning flag systems which can be used for warning motorists not to park in an emergency zone through a pivotable flag system. In this regard, the present invention substantially fulfills this need.

SUMMARY OF THE INVENTION

In view of the disadvantages inherent in the known types of flag systems now present in the prior art, the present invention provides improved emergency warning flag systems. As such, the general purpose of the present invention, which will be described subsequently in greater detail, is to provide a new and improved emergency warning flag system which has all the advantages of the prior art and none of the disadvantages.

To attain this, the present invention essentially comprises an emergency warning flag system adapted to mark areas for use solely by emergency vehicles comprising, in combination, a vertically extending, elongated flag pole having an upper end and a lower end; a flexible flag secured with respect to the upper end of the flag pole; a horizontal aperture extending diametrically through the lower end of the flag pole; a base unit formed generally in the shape of an inverted truncated cone with a vertical slot extending through the upper extent of the cone; attachment means extending downwardly from the base member for securement to the ground; a pin extending horizontally through the hole in the lower end of the flag pole and secured at its ends into the base at a central extent of its vertical slot; a spring formed of flexible plates on opposite sides of the pole adapted to secure the flag pole in a vertical orientation during normal operation and use of warning motorists not to park thereadjacent, the flag being pivotable about the pin to a generally horizontal orientation when hit by a vehicle moving in contact with the pole; and a tool formed with a central ring-like member with semi-circular projections extending radially inwardly and with handles extending radially outwardly, the projections adapted to releasably contact associated semi-circular recesses in the base to facilitate the screwing in and screwing out of the base with respect to the ground.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

An even further object of the present invention is to provide new and improved emergency warning flag systems which are susceptible of a low cost of manufacture with regard to both materials and labor, and which accordingly are then susceptible of low prices of sale to the consuming public, thereby making such emergency warning flag systems economically available to the buying public.

Lastly, it is an object of the present invention to provide an emergency warning flag system adapted to mark areas for use solely by emergency vehicles comprising, in combination a vertically extending, elongated flag pole having an upper end and a lower end; a flexible flag secured with respect to the upper end of the flag pole; a horizontal aperture extending diametrically through the lower end of the flag pole; a base unit formed generally in the shape of an inverted truncated cone with a vertical slot extending through the upper extent of the cone; attachment means extending downwardly from the base member for securement to the ground; a pin extending horizontally through the hole in the lower end of the flag pole and secured at its ends into the base at a central extent of its vertical slot; and a spring adapted to secure the flag pole in a vertical orientation during normal operation and use of warning motorists not to park thereadjacent, the flag being pivotable about the pin to a generally horizontal orientation when hit by a vehicle moving in contact with the pole.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
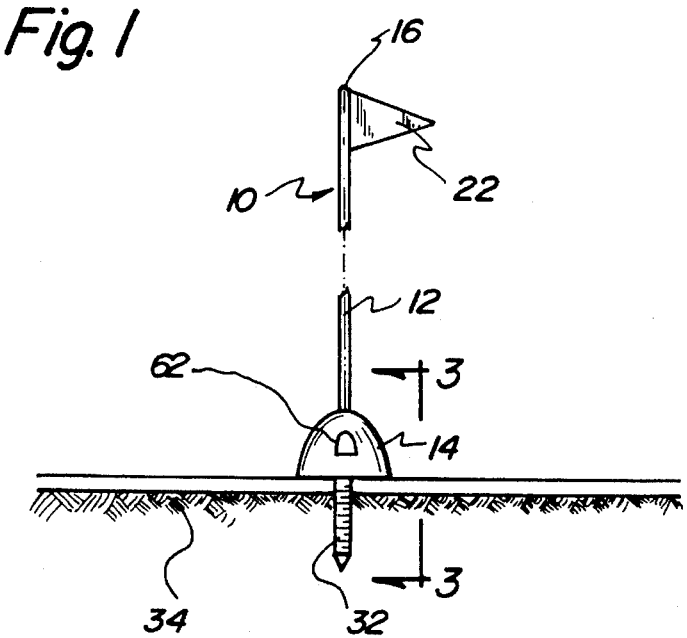
FIG. 1 is a side elevational view of the preferred embodiment of the emergency warning flag system constructed in accordance with the principles of the present invention.
Figure 2:
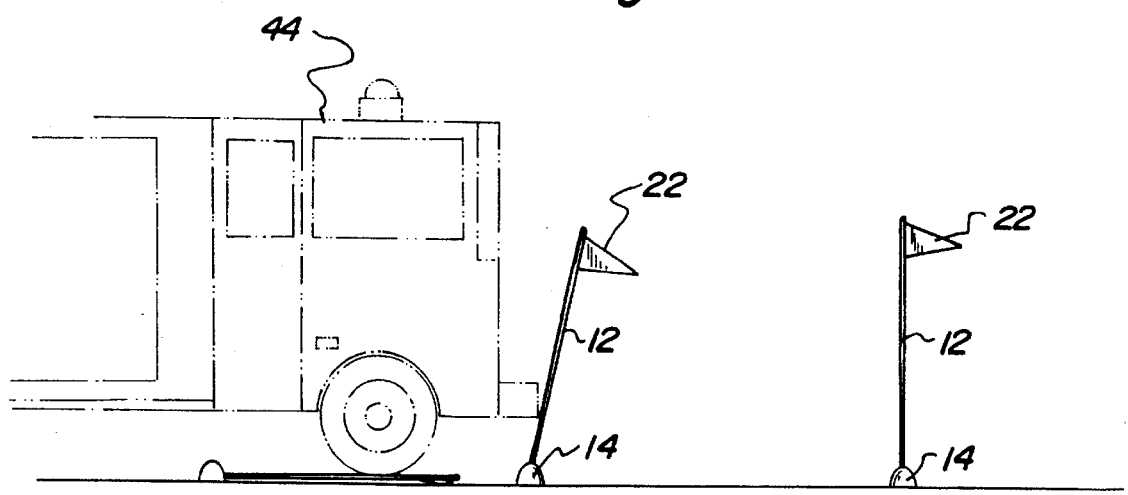
FIG. 2 is a side elevational view of a plurality of the flags shown in FIG. 1 illustrating their movement when contacted by a vehicle.
Figure 3:
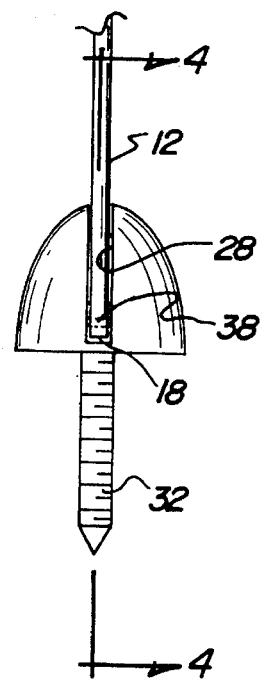
FIG. 3 is a sectional view taken along line 3–3 of FIG. 1.

With reference now to the drawings, and in particular to FIG. 1 thereof, the preferred embodiment of the new and improved emergency warning flag system embodying the principles and concepts of the present invention and generally designated by the reference numeral 10 will be described.

Generally, it will be noted in FIGS. 1 through 5, there is shown a new and improved emergency warning flag system 10 adapted to mark areas for use solely by emergency vehicles. In the most basic of terms, the system 10 includes a flag pole 12 and a base 14 and coupling mechanisms there between.

More specifically, the flag pole 12 is an elongated, vertically extending member. Such member has an upper end 16 and a lower end 18. A flexible flag 22 is secured with respect to the upper end of the flag pole 12. A horizontal aperture 24 extends diametrically through the lower end of the flag pole. The aperture has a circular cross-sectional configuration. The center of the circle constitutes an axis of rotation.

The second major component of the system 10 is a base unit 14. The base 14 is formed of a hard elastomeric material. It is fabricated in the shape of an inverted truncated cone. A vertical slot 28 extends vertically through the upper extent of the cone.

The base also includes an attachment means 32. The attachment means extends downwardly from the bottom of the base and is formed with threads for releasable securement to the ground 34.

Extending horizontally through the hole in the flag pole 12 is a pin 38. The pin is located adjacent to the lower end 18 of the flag pole 12. The pin 38 is secured at its ends into adjacent recesses in the base 14 at a central extent of its vertical slot 28.

Figure 4:
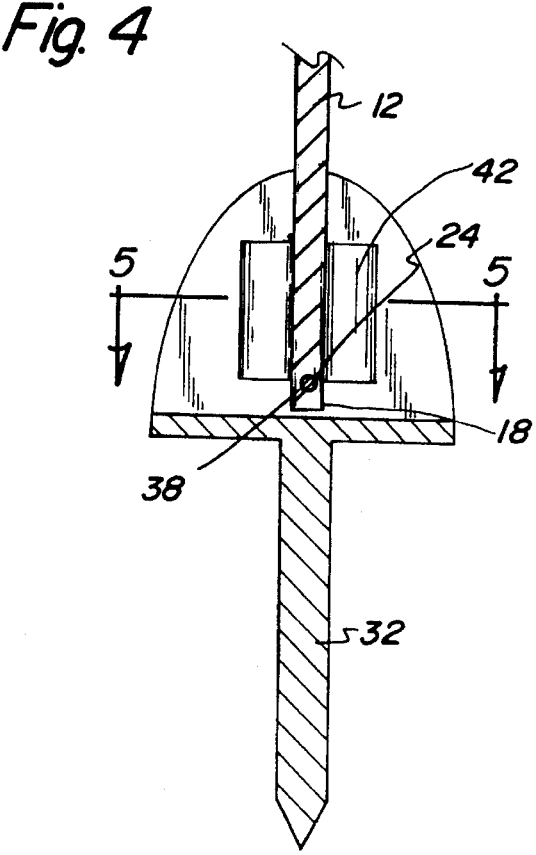
FIG. 4 is a sectional view of the device taken along line 4—4 of FIG. 3.
Figure 5:
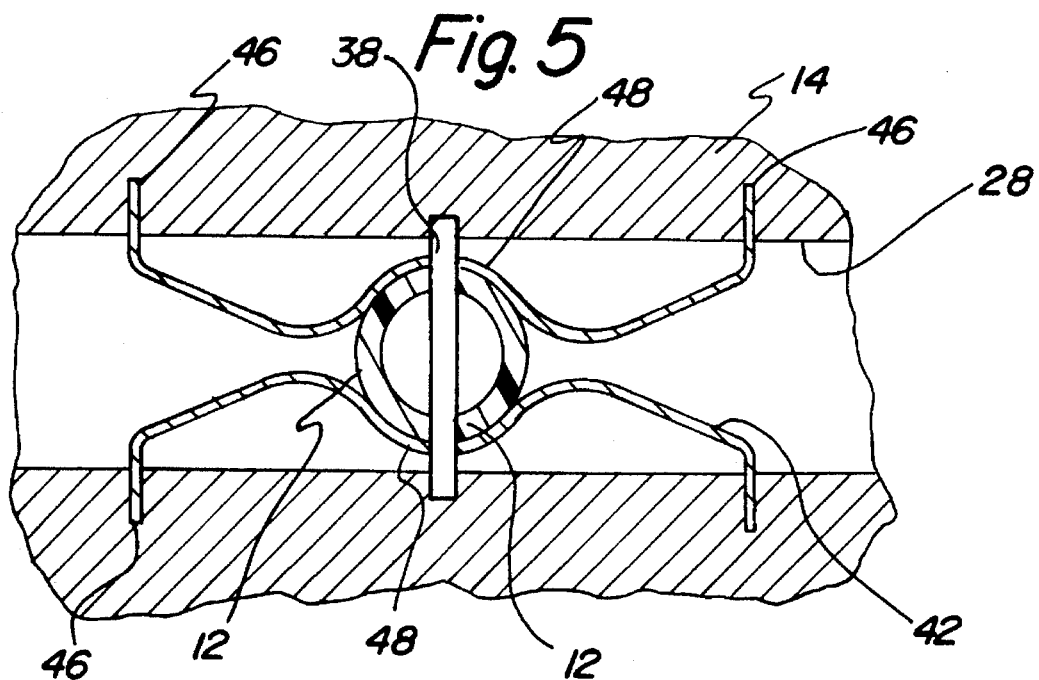
FIG. 5 is a sectional view taken along line 5—5 of FIG. 4.
Figure 6:
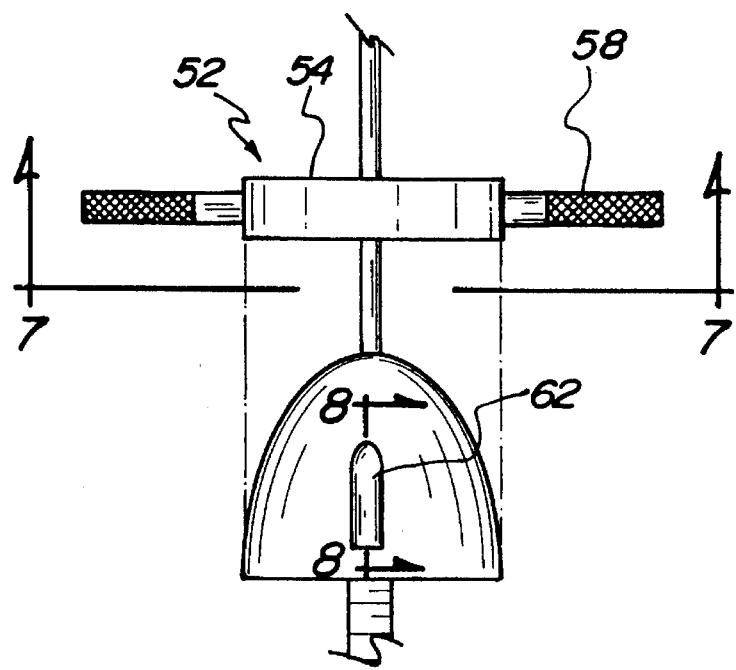
FIG. 6 is a side elevational view of a portion of the device shown in FIGS. 1 through 5.
Figure 7:
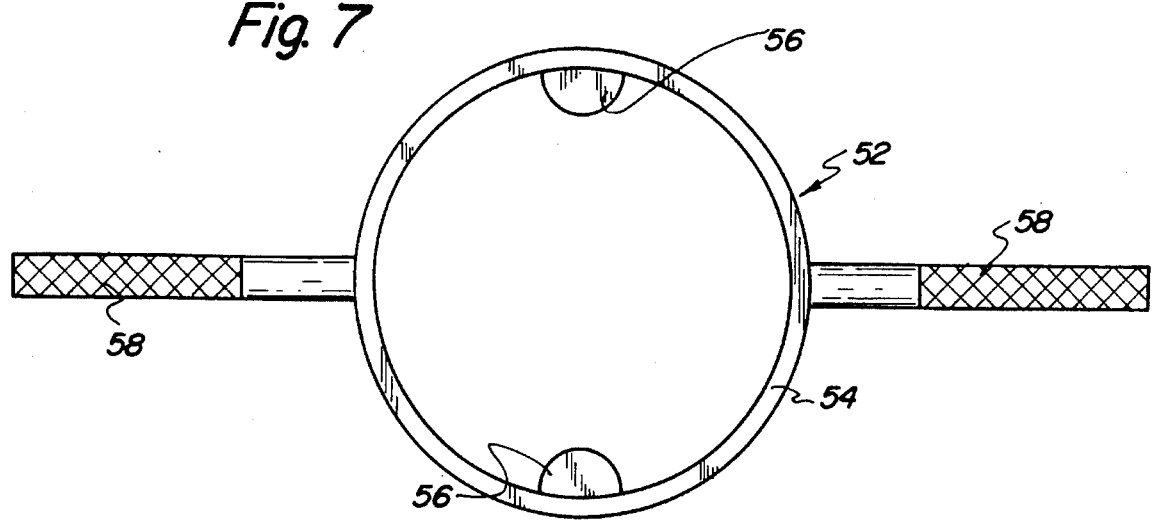
FIG. 7 is a top plan view of the tool shown in FIG. 6.
Figure 8:
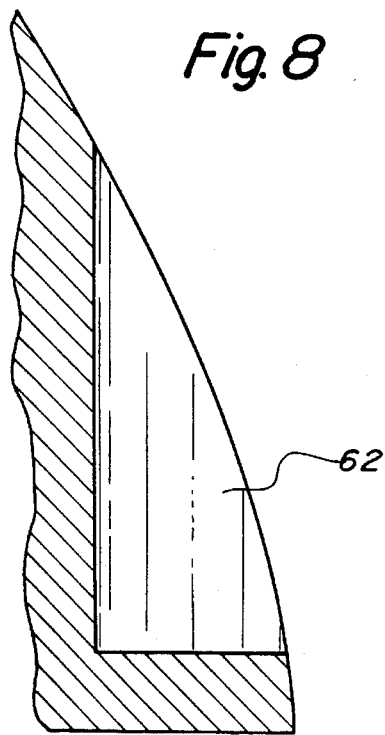
FIG. 8 is an enlarged sectional view taken along line 8—8 of FIG. 6.

A spring 42 is adapted to secure the flag pole 12 in a vertical orientation during normal operation and use of warning people not to park. The flag pole is pivotable about the axis of the aperture 24 and pin 38 to a generally horizontal orientation when hit by a vehicle 44 moving into contact with the flag pole 12. As can be seen in FIGS. 4 and 5, the spring is formed of two sheets of spring steel. The sheets have free ends 46 extending inwardly into the material of the base on opposite sides of the slot 28. Central extents 48 are curved to contact and secure the flag pole 12 in its vertical orientation. When pivoted about pin 38, however, the flag pole will move to the horizontal through the deforming of the spring 42. Thereafter, the flag pole 12 may be returned to the vertical orientation and again held by the springs as shown in FIG. 5.

Next provided is a tool 52 formed with a central ring-like member 54. The ring like member 54 has circular projections 56 which extend radially inwardly. Handles 58 extend radially outwardly from the ring like member. The projections 56 are adapted to releasably contact associated vertically extending recesses 62 in the base 14. The recesses 62 are adapted to receive the projections 56 so that the handles 58 may be twisted to facilitate the screwing in and screwing out of the base 14 with respect to the ground 34.

The present invention is intended to be used to demarcate fire lanes in front of department stores and the like. Its purpose is to provide an effective deterrent to parking in those lanes, which are supposed to be kept clear for emergency vehicles such as fire trucks and police cars.

The problem is that people frequently ignore the emergency status of these lanes and park their cars there while they "just run in" to the mall for a "quick" errand. With the large number of people doing this, however, the net result is that emergency lanes are at least partially obstructed a large percentage of the time. The present invention effectively reduces this problem.

It is anticipated that a whole row of this type of flag would be used together, thus effectively sealing off the desired area. There is no doubt that the present invention would result in motorists having more respect for emergency lanes than is currently the case.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An emergency warning flag system adapted to mark areas for use solely by emergency vehicles comprising, in combination:

a vertically extending, elongated flag pole having an upper end and a lower end with a hole;

a flexible flag secured with respect to the upper end of the flag pole;

a base unit formed generally in the shape of an inverted truncated cone with a vertical slot extending through the upper extent of the cone;

attachment means extending downwardly from the base unit for securement to a ground surface;

a pin extending horizontally through the hole in the lower end of the flag pole and secured into the base unit at a central extent of the vertical slot;

a spring formed of flexible plates on opposite sides of the pole, the spring adapted to secure the flag pole in a vertical orientation during normal operation and use of warning motorists not to park thereadjacent, the flag pole and the spring being pivotable about the pin wherein the flag pole is movable to a generally horizontal orientation when hit by a vehicle moving in contact with the pole; and a tool formed with a central ring-like member with semi-circular projections extending radially inwardly and with handles extending radially outwardly, the projections adapted to releasably contact associated semi-circular recesses in the base unit to facilitate the screwing in and screwing out of the base unit with respect to the ground surface.

2. An emergency warning flag system adapted to mark areas for use by emergency vehicles comprising:

a vertically extending, elongated flag pole having an upper end and a lower end with a hole;

a flexible flag secured with respect to the upper end of the flag pole;

a base unit formed generally in the shape of an inverted truncated cone with a vertical slot extending through the upper extent of the cone;

attachment means extending downwardly from the base unit for securement to a ground surface;

a pin extending horizontally through the hole in the lower end of the flag pole and secured into the base unit at a central extent of the vertical slot;

a spring adapted to secure the flag pole in a vertical orientation during normal operation and use of warning motorists not to park thereadjacent the flag pole and the spring being pivotable about the pin wherein the flag pole is movable to a generally horizontal orientation when hit by a vehicle moving in contact with the pole; and a tool formed with a central ring-like member with projections extending radially inwardly and with handles extending radially outwardly, the projections adapted to releasably contact associated recesses in the base unit to facilitate the screwing in and screwing out of the base unit with respect to the ground surface.

* * * * *